United States Patent
Boischio

(10) Patent No.: US 7,484,992 B2
(45) Date of Patent: Feb. 3, 2009

(54) ASSEMBLY FOR CONNECTING AN ELECTRONIC CONTROL BOARD TO THE STATOR WINDINGS OF AN ELECTRIC MOTOR FOR ROLLER BLINDS OR THE LIKE

(75) Inventor: Ido Boischio, Padua (IT)

(73) Assignee: Inarca S.p.A., Vigodarzere (IT)

( * ) Notice: Subject to any disclaimer, the term of this patent is extended or adjusted under 35 U.S.C. 154(b) by 0 days.

(21) Appl. No.: 11/905,425

(22) Filed: Oct. 1, 2007

(65) Prior Publication Data
US 2008/0022597 A1 Jan. 31, 2008

(30) Foreign Application Priority Data
Oct. 3, 2006 (IT) .......................... PD2006A0361

(51) Int. Cl.
*H01R 11/20* (2006.01)
(52) U.S. Cl. .......................... 439/404; 439/636; 310/71
(58) Field of Classification Search ................. 439/404, 439/636; 310/71
See application file for complete search history.

(56) References Cited

U.S. PATENT DOCUMENTS

| | | | | |
|---|---|---|---|---|
| 4,533,202 | A * | 8/1985 | Pohl | 439/638 |
| 4,715,824 | A * | 12/1987 | Verhoeven | 439/391 |
| 5,412,271 | A | 5/1995 | Mizuno et al. | |
| 5,975,937 | A * | 11/1999 | Boischio | 439/404 |
| 6,177,741 | B1 | 1/2001 | Luetkenhaus et al. | |
| 6,652,293 | B2 * | 11/2003 | Fuchs et al. | 439/76.1 |
| 6,685,507 | B2 * | 2/2004 | Piovesan | 439/596 |
| 6,744,160 | B2 * | 6/2004 | Piovesan | 310/68 C |
| 6,756,711 | B2 * | 6/2004 | Matsuyama et al. | 310/68 R |
| 7,014,504 | B2 * | 3/2006 | Boischio | 439/590 |
| 7,270,564 | B1 * | 9/2007 | Boischio | 439/417 |
| 2002/0094720 | A1 * | 7/2002 | Piovesan | 439/596 |
| 2003/0098660 | A1 * | 5/2003 | Erdman et al. | 318/254 |
| 2003/0193768 | A1 * | 10/2003 | Boischio | 361/103 |
| 2005/0208830 | A1 * | 9/2005 | Boischio | 439/607 |
| 2007/0149034 | A1 * | 6/2007 | Boischio | 439/417 |
| 2008/0026617 | A1 * | 1/2008 | Boischio | 439/157 |
| 2008/0093940 | A1 * | 4/2008 | Boischio | 310/71 |
| 2008/0093941 | A1 * | 4/2008 | Boischio | 310/71 |
| 2008/0197729 | A1 * | 8/2008 | Igarashi | 310/71 |

FOREIGN PATENT DOCUMENTS

DE 35 09 188 A1 9/1986

* cited by examiner

*Primary Examiner*—Ross N Gushi
(74) *Attorney, Agent, or Firm*—Modiano & Associati; Albert Josif; Daniel J. O'Byrne

(57) ABSTRACT

An assembly for connecting an electronic control board to the stator windings of an electric motor for roller blinds having a base with, on a first face, an element for centering on the stator of the motor at an end face of the stator. A first body for accommodating first electrical terminals for direct connection to first leads of the stator windings and a second body for accommodating second electrical terminals for direct connection to second leads of the stator windings protrude from the opposite second face of the base. The second electrical terminals are in direct electrical contact with an electronic board; the second body has a slot which intersects the seats on which the second electrical terminals are provided; the electronic board can be inserted in the slot.

9 Claims, 3 Drawing Sheets

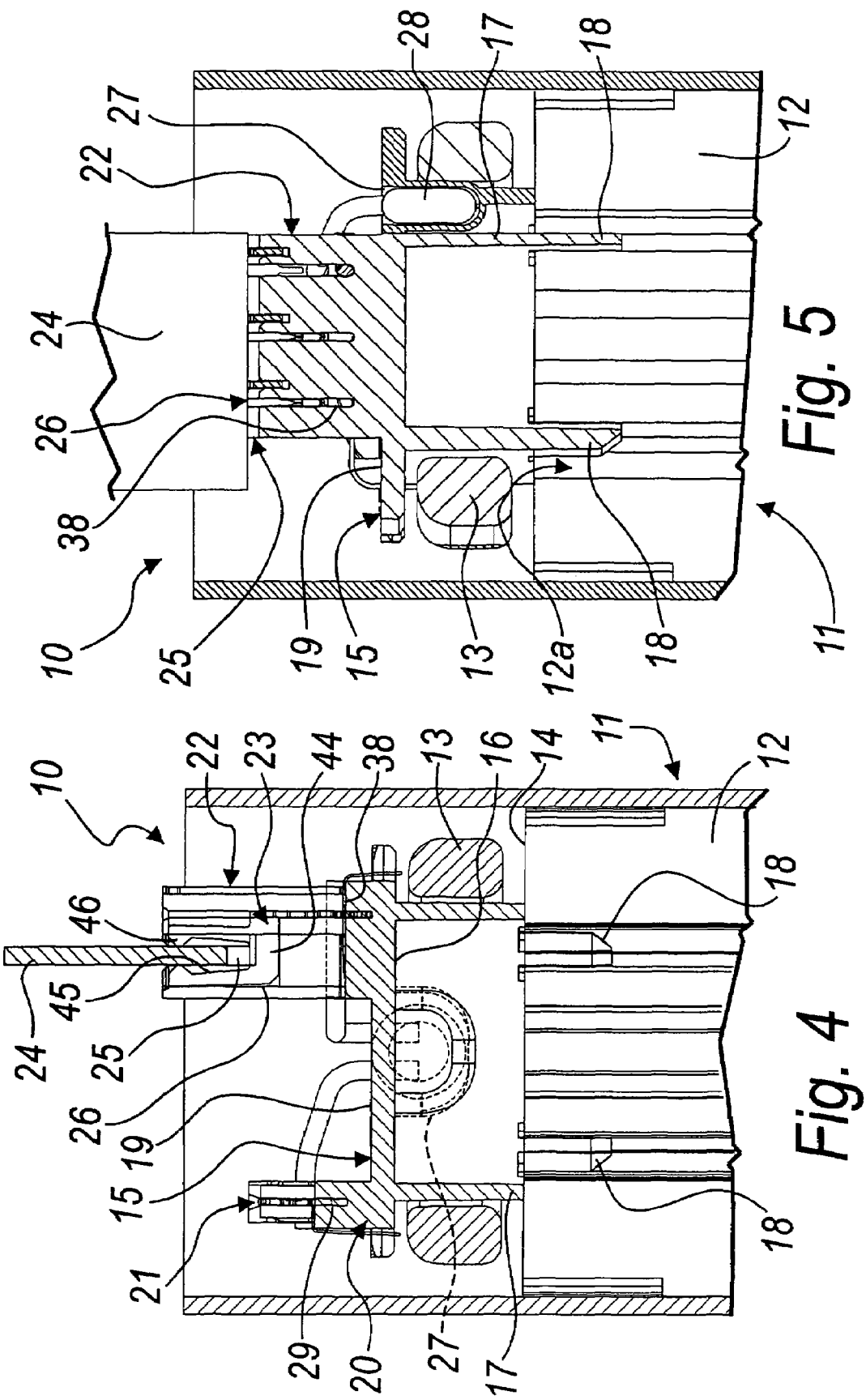

ASSEMBLY FOR CONNECTING AN ELECTRONIC CONTROL BOARD TO THE STATOR WINDINGS OF AN ELECTRIC MOTOR FOR ROLLER BLINDS OR THE LIKE

The present invention relates to an assembly for connecting an electronic control board to the stator windings of an electric motor for roller blinds or the like.

BACKGROUND OF THE INVENTION

As is known, when small electric motors are accommodated in equally small compartments, such as for example in the case of electric motors of roller blinds, which are confined within tight tubular casings, the electronic control boards of said motors, which are connected to the stator windings, are accommodated externally with respect to such compartments; the connection is derived by means of wires which are connected in various manners to the windings.

This is necessary because direct connections by means of traditional connecting assemblies are usually bulky and not always ensure stable contact.

It is evident that it is inconvenient, particularly for operators who perform assemblies of the automated type, to have to provide a wired connection between the windings and the electronic board.

Moreover, there is often little space also outside the casing that contains the motor, since certain products which use small motors may be accommodated in tight spaces.

Therefore, the presence of the electronic board (and of the covering and insulation system that it requires) can interfere with the space available.

SUMMARY OF THE INVENTION

The aim of the present invention is to solve the drawbacks observed in relation to the electrical connection between electronic boards and stator windings of small motors.

Within this aim, an object of the present invention is to provide an assembly for connecting an electronic control board to the stator windings of an electric motor for roller blinds or the like which allows to connect the electronic board in a position which is close to the windings.

Another object of the present invention is to provide an assembly for connecting an electronic control board to the stator windings of an electric motor for roller blinds or the like which allows an extremely stable connection for said electronic board.

This aim and these and other objects, which will become better apparent hereinafter, are achieved by an assembly for connecting an electronic control board to the stator windings of an electric motor for roller blinds or the like, characterized in that it comprises a base which has, on a first face, means for centering on the stator of the motor at an end face of said stator, an abutment body for the stator windings protruding from said base toward the coupling to the end face of the stator, a first body for accommodating first electrical terminals for direct connection to first leads of the stator windings and a second body for accommodating second electrical terminals for direct connection to second leads of the stator windings protruding from the opposite second face of the base, said second electrical terminals being directly in electrical contact with the electronic board, said second body having a slot which intersects the seats on which said second terminals are provided, said slot being extended substantially in the same direction as said second body, the electronic board being insertable in said slot.

BRIEF DESCRIPTION OF THE DRAWINGS

Further characteristics and advantages of the invention will become better apparent from the following detailed description of a preferred but not exclusive embodiment thereof, illustrated by way of non-limiting example in the accompanying drawings, wherein:

FIG. 4 is a sectional view of the connection assembly, taken along the line IV-IV of FIG. 2;

FIG. 5 is a sectional view of the connection assembly, taken along the line V-V of FIG. 2.

DESCRIPTION OF THE PREFERRED EMBODIMENTS

Figure 1:
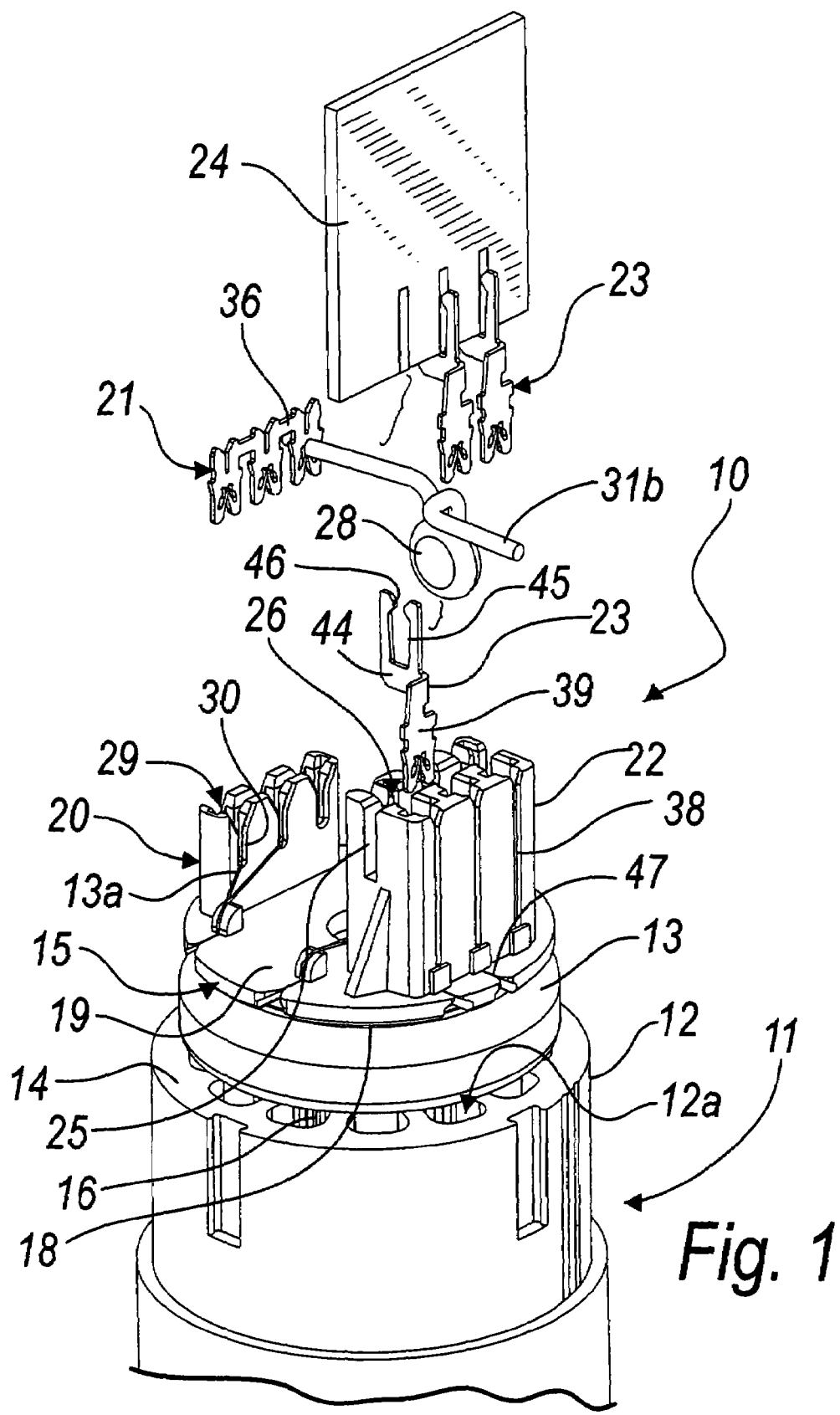
FIG. 1 is an exploded perspective view of a connection assembly according to the invention, applied to an electric motor.

It is noted that anything found to be already known during the patenting process is understood not to be claimed and to be the subject of a disclaimer.

With reference to the figures, an assembly for connecting an electronic control board to the stator windings of an electric motor for roller blinds or the like, according to the invention, is generally designated by the reference numeral 10.

As clearly shown in FIG. 1, an electric motor, designated by the reference numeral 11, is of the type which has a substantially cylindrical contour; a stator 12 in fact has a cylindrical shape and stator windings 13 (shown schematically in the figures as a monolithic torus) are arranged at an end face 14 of the stator 12.

The connection assembly 10 comprises a circular base 15 made of plastic material, which has, on a first face 16, an abutment body 17 for the stator windings 13, such as a ring around which said stator windings are arranged; the outward edge of the ring 17 rests on the base 14.

Means 18 for centering on the stator 12 protrude from the first face 16 centrally with respect to the ring 17 substantially at the base 14 of said stator; said centering means are constituted by teeth which are inserted in gaps 12a of the stator 12.

Figure 3:
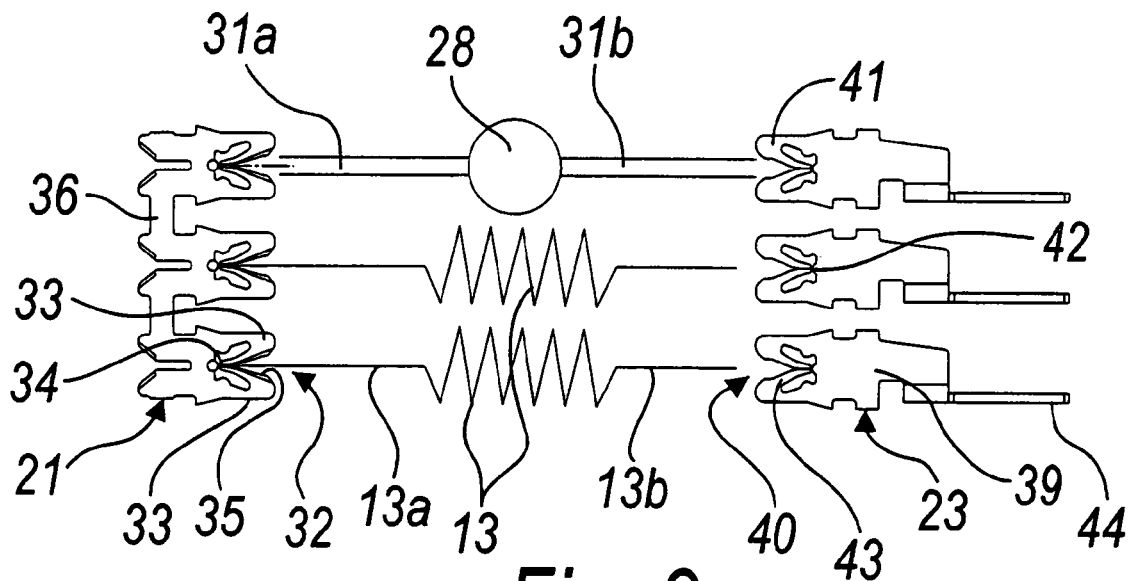
FIG. 3 is a diagram of the electrical connections of the leads of the stator windings.
Figure 2:
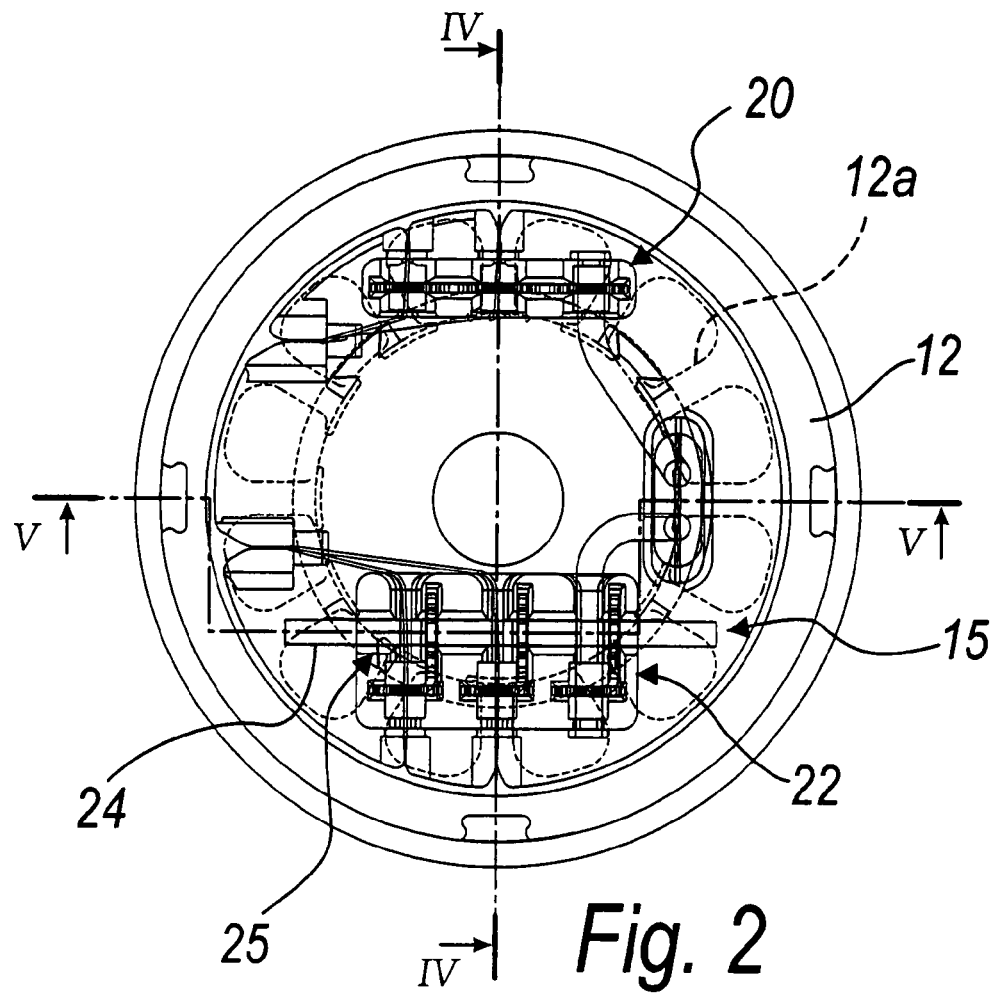
FIG. 2 is a top view of the connection assembly of FIG. 1.

A first body 20 for accommodating first electrical terminals 21 for connection to first leads 13a of the stator windings 13 and a second body 22 for accommodating second electrical terminals 23 connected to second leads 13b of the stator windings protrude monolithically from an opposite second face 19 of the circular base 15, in a manner shown in FIG. 3.

The second electrical terminals 23 are directly in electrical contact with an electronic board, generally designated by the reference numeral 24.

In order to ensure the stability of the electronic board 24, a slot 25 is provided on the second body 22 and the board 24 can be inserted therein; said slot lies substantially in the same direction along which the second body 22 lies and intersects seats 26 on which the second terminals 23 are inserted.

Further, as shown in FIG. 3, a pocket 27 for accommodating a thermal protection device 28 connected to the first and second terminals 21 and 23 is provided on the circular base 15, which is open on the second face 19.

The first body is provided with receptacles 29 for the first terminals 21.

The receptacles 29 are provided with respective first grooves 30, which are mutually parallel and are arranged transversely to the extension of said receptacles and pass through all of the first body 20.

An electrical wire can be arranged on the bottom of each groove 30.

In particular, in this configuration, the first leads 13a of the stator windings can be arranged on two grooves 30, while a first wire 31a for connection to the thermal protection device 28 is arranged on the remaining groove.

The arrangement of the wires on said first grooves allows electrical contact with the first terminals 21 when they are inserted in the receptacles 29.

As clearly shown in the electrical diagram of FIG. 3, the first terminals 21 are in fact constituted by plates which are provided with self-centering tapered seats 32 for accommodating the leads 13a of the stator windings 13 and for a first wire 28a.

In particular, each first terminal 21 is constituted by mutually opposite wings 33, which are folded on the same plane of arrangement as the terminal 21, with free ends 34 which mutually converge at the axis of said plate so as to form the self-centering tapering seat 32 for accommodating a respective wire lead.

In particular, the mutually opposite wings 33 are contoured at the mutually facing edge portions so as to form blades 35 which are adapted to cut into the enamel that covers the wires.

As clearly shown, the first terminals 21 are connected by strips 36 (they are provided monolithically) so as to form an electric bridge.

Like the first body 20, the seats 26 of the second body 22 on which the second terminals 23 are inserted are provided with respective second grooves 38, which are mutually parallel, are arranged transversely to the extension of the seats 26, and pass through all of the second body 20.

An electrical wire can be arranged on the bottom of each second groove 38.

In particular, in this configuration, it is possible to arrange on two second grooves 38 the second leads 13b of the stator windings, while the second wire 31b for connection to the thermal protection device 28 is arranged on the remaining groove.

In this case also, the arrangement of the wires on said second grooves allows electrical contact with the second terminals 23 when they are inserted in the seats 26.

Each second terminal 23 is constituted by two flat portions.

A first flat portion 39 is substantially similar to a single first terminal 21 and is parallel to the electronic board 24 when it is inserted in the respective seat 26.

Said board in practice has a self-centering tapering seat 40 for accommodating the leads 13b of the stator windings 13 and for the second wire 28b.

In particular, the first flat portion 39 is constituted by mutually opposite wings 41, which are folded on the same plane of arrangement as the first flat portion 39, with free ends 42 which mutually converge at the axis of said flat portion so as to form the self-centering tapering seat 40 for accommodating a respective wire lead.

In particular, the mutually opposite wings 41 are contoured at the mutually facing edge portions so as to form blades 43 which are adapted to cut into the enamel that covers the wires.

The second flat portion 44 lies at right angles to the flat extension of the first flat portion 39 and parallel to the extension of the seats 26.

In particular, the second flat portion 44 has an open slit 45 for the insertion of the electronic board 24.

The end regions of the slit 45 have recesses 46 for electrical contact with the electronic board 24.

In practice, when each second terminal 23 is completely inserted in the corresponding seat 26, the slit 45 substantially follows, except for the recesses 46, the profile of the slot 25.

To ensure optimum locking of the leads of the stator windings 13, wire guiding notches 47 are provided on the edge of the base 15.

In practice it has been found that the invention thus described achieves the intended aim and objects.

The present invention in fact provides an assembly for connecting an electronic control board to the stator windings of an electric motor for roller blinds or the like which allows to connect the board directly to the head of the motor by means of compact connectors.

The slot provided in the second body allows stable accommodation and electrical contact of the electronic board with the second electrical terminals.

The shape of said terminals also helps to ensure a stable electrical contact.

The invention thus conceived is susceptible of numerous modifications and variations, all of which are within the scope of the appended claims; all the details may further be replaced with other technically equivalent elements.

In practice, the materials employed, so long as they are compatible with the specific use, as well as the dimensions, may be any according to requirements and to the state of the art.

The disclosures in Italian Patent Application No. PD2006A000361 from which this application claims priority are incorporated herein by reference.

What is claimed is:

1. An assembly for connecting an electronic control board to stator windings of a stator of an electric motor for roller blinds, comprising: an abutment body for the stator windings; a base which has, on a first face thereof, centering means for centering on the stator of the motor at an end face of said stator, said abutment body protruding from said base toward a coupling to an end face of the stator; a first body for accommodating first electrical terminals for direct connection to first leads of the stator windings; a second body with seats for accommodating second electrical terminals for direct connection to second leads of the stator windings protruding from a second face of said base that is opposite said first face thereof; an electronic board; said second electrical terminals being directly in electrical contact with said electronic board; a slot provided in said second body and which intersects said seats on which said second electrical terminals are provided, said slot extending substantially in a same direction as said second body with respect to said base, and the electronic board being insertable in said slot.

2. The connection assembly of claim 1, comprising: receptacles for said first terminals, formed in said first body, that are provided with respective first grooves, which are mutually parallel and are arranged transversely to an extension of said receptacles and pass through all of said first body; and an electrical wire that is arrangeable on a bottom region of each said first groove.

3. The connection assembly of claim 1, wherein said seats of said second body in which said second terminals are inserted are provided with respective second grooves, said second grooves being mutually parallel, arranged transversely to an extension of said seats and pass through all of said second body, each said second groove being suitable to accommodate on a bottom region thereof an electrical wire.

4. The connection assembly of claim 1, wherein said base is substantially circular and said abutment body is constituted by a ring, an outward edge of which is adapted to rest against the base of the stator, said centering means for centering on the stator being constituted by teeth which are adapted to be inserted in gaps of said stator.

5. The connection assembly of claim 1, further comprising a pocket provided on said base open onto said second face for accommodating a thermal protection device connected to said first and second terminals.

6. The connection assembly of claim 1, wherein each of said second terminals is constituted by two flat portions, a first flat portion and a second flat portion, said first flat portion being parallel to a direction of insertion in said slot of the electronic board when the board is inserted in the respective said slot, and wherein said first flat portion has a self-centering tapering seat for accommodating electrical wires, said second flat portion being arranged at right angles to a flat extension of the first flat portion and parallel to an extension of a respective said containment seat, and wherein said second flat portion has an open slit for insertion of the electronic board, end regions of said slit having recesses for electrical contact with the electronic board.

7. The connection assembly of claim 6, wherein upon complete insertion of each of said second terminals in a corresponding said seat, said slit substantially follows, except for said recesses, a profile of said slot.

8. The connection assembly of claim 6, wherein said first flat portion is constituted by mutually opposite wings, which are folded on a same plane of arrangement as said first flat portion, and have free ends which mutually converge at an axis of said flat portion so as to form said self-centering tapering seat for accommodating a respective wire lead, said mutually opposite wings being contoured at said mutually facing edge portions so as to form blades which are adapted to cut into wire covering enamel.

9. The connection assembly of claim 8, comprising wire guiding notches located on an edge of said base.

* * * * *